(12) United States Patent
Kohlmeier et al.

(10) Patent No.: US 11,385,914 B2
(45) Date of Patent: Jul. 12, 2022

(54) HYBRID INTELLIGENCE APPROACH TO ELICITING KNOWLEDGE FOR INLINE NOTES

(71) Applicant: Microsoft Technology Licensing, LLC, Redmond, WA (US)

(72) Inventors: Bernhard S. J. Kohlmeier, Seattle, WA (US); Luis Carlos Vargas Herring, Redmond, WA (US); Mark J. Encarnacion, Bellevue, WA (US); Patrick Pantel, Bellevue, WA (US); Jaime Brooks Teevan, Bellevue, WA (US); Victor Poznanski, Sammamish, WA (US); Woon Kiat Wong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1229 days.

(21) Appl. No.: 15/860,279

(22) Filed: Jan. 2, 2018

(65) Prior Publication Data

US 2019/0205772 A1 Jul. 4, 2019

(51) Int. Cl.
*G06F 9/451* (2018.01)
*G06F 40/169* (2020.01)
*G06Q 10/06* (2012.01)
*H04L 67/10* (2022.01)

(52) U.S. Cl.
CPC ........... *G06F 9/453* (2018.02); *G06F 40/169* (2020.01); *G06Q 10/06311* (2013.01); *G06Q 10/063114* (2013.01); *H04L 67/10* (2013.01)

(58) Field of Classification Search
CPC . G06F 9/453; G06F 40/169; G06Q 10/06311; G06Q 10/063114; H04L 67/10
See application file for complete search history.

(56) References Cited

U.S. PATENT DOCUMENTS 6,438,564 B1 * 8/2002 Morton ................ G06F 40/169
715/206
6,950,982 B1 * 9/2005 Dourish ............... G06F 40/169
715/234
8,984,080 B1 * 3/2015 Curtis .................. A63F 13/847
709/206

(Continued)

OTHER PUBLICATIONS

"In International Search Report and the Written Opinion Issued in PCT Application No. PCT/US2018/065570", dated Apr. 4, 2019, 11 Pages.

*Primary Examiner* — Justin R. Blaufeld
(74) *Attorney, Agent, or Firm* — Talem IP Law, LLP

(57) ABSTRACT

A content creation application can include a feature that receives an inline note within a document and communicates the content of the inline note and a user identifier associated with an author of the inline note to an intelligence service. The intelligence service can identify, from the content of the inline note, one or more agents and a request, the identified one or more agents being the author, one or more person agents, one or more bot agents, or a combination thereof. Based on the identified agent (or lack thereof), the intelligence service can generate a message to each of the one or more agents and communicate the message to the each of the one or more agents over a communication channel. A person agent or the author can receive the message and view the message using the appropriate communication application without accessing the original document.

14 Claims, 12 Drawing Sheets

(56) References Cited

U.S. PATENT DOCUMENTS

| | | | |
|---|---|---|---|
| 2002/0023138 A1* | 2/2002 | Quine | H04L 29/1215 709/206 |
| 2002/0175955 A1* | 11/2002 | Gourdol | G06F 3/0482 715/821 |
| 2004/0049539 A1* | 3/2004 | Reynolds | G06F 3/165 709/203 |
| 2011/0035453 A1* | 2/2011 | Koul | G06Q 10/107 709/206 |
| 2012/0110082 A1* | 5/2012 | Brown | G06F 16/9558 709/204 |
| 2012/0245925 A1* | 9/2012 | Guha | G06F 40/237 704/9 |
| 2013/0110940 A1* | 5/2013 | Pasquero | G06F 3/0488 709/206 |
| 2014/0012614 A1* | 1/2014 | Beresford-Wood | G06Q 40/12 705/7.15 |
| 2014/0089417 A1* | 3/2014 | Van Os | H04L 51/00 709/206 |
| 2014/0181697 A1* | 6/2014 | Kirigin | G06F 3/048 715/758 |
| 2014/0279996 A1* | 9/2014 | Teevan | G06F 16/38 707/706 |
| 2015/0264180 A1* | 9/2015 | Wolthuis | H04M 3/5175 379/265.12 |
| 2016/0050221 A1* | 2/2016 | Myslinski | H04L 63/1408 726/22 |
| 2016/0219003 A1* | 7/2016 | Kumar | G06Q 10/107 |
| 2017/0097765 A1* | 4/2017 | Chao | H04W 4/02 |
| 2018/0359132 A1* | 12/2018 | Salameh | G06F 16/3329 |
| 2020/0168218 A1* | 5/2020 | Eriksson | G06N 5/02 |

* cited by examiner

HYBRID INTELLIGENCE APPROACH TO ELICITING KNOWLEDGE FOR INLINE NOTES

BACKGROUND

Content creation applications are software applications in which users can create text and/or image-based content in digital form. Some content creation applications support collaboration. In most cases, content creation applications include tools for authoring new content and editing existing content. Examples of content creation applications include, but are not limited to, note-taking applications such as MICROSOFT ONENOTE and EVERNOTE, freeform digital canvases such as GOOGLE JAMBOARD and MICROSOFT Whiteboard, word processing applications such as MICROSOFT WORD, GOOGLE DOCS, and COREL WORDPERFECT, presentation applications such as MICROSOFT POWERPOINT and PREZI, as well as various productivity, computer-aided design, blogging, and photo and design software.

In order to preserve the flow of their stories when writing in word processing and other content creation applications, users often leave themselves and others inline notes. Users may leave notes for themselves, but need reminding about them. Users may leave notes for other people, but have to let those people know that there is a question and often have to follow up to get a response and ask about their progress. When users want to respond to their notes, they need to go back to the canvas of the application to see the request.

BRIEF SUMMARY

A hybrid intelligence approach to eliciting knowledge for inline notes is described. The described systems and techniques provide intelligence support for filling in content in a document that was marked in some manner to be filled in later. A hybrid intelligence approach to eliciting knowledge for inline notes leverages a bot framework and person or bot agents, including the author of the inline note, to request responses on behalf of a user in a document and provide the responses for direct insertion into the document having the inline note—without the agent having access to the document itself.

A content creation application can include a feature that receives an inline note within a document; once the inline note is complete or at any other suitable time, the content creation application can communicate the content of the inline note and a user identifier associated with an author of the inline note to an intelligence service. The intelligence service can identify, from the content of the inline note and optionally from document and/or user context, one or more agents and a request, the identified one or more agents being the author, one or more person agents, one or more bot agents, or a combination thereof. Some bot agents may be used to interface with a community of users (e.g., to provide crowd-sourced or gig economy content) Based on the identified agent (or lack thereof), the intelligence service can generate a message to each of the one or more agents and communicate the message to the each of the one or more agents over a communication channel. The message includes the request from the author of the inline note. In some cases, a storage resource can be checked to determine whether a response exists that could satisfy the query. In case there already exists a response, the intelligence service may omit generating and communicating the message or may still generate and communicate the message, but provide both responses to the author of the inline note. In some cases, the information in the storage resource can be used to assist the responding agent with additional context or suggested responses for the responding agent to compose a response.

A person or bot agent or the author can receive the message and view the message using the appropriate communication application, inline note feature, or framework (e.g., bot framework). The message can include input fields, commands, and/or links to enable the person agent to input a response to the request. A bot agent may receive the message via suitable interfaces for the bot.

The intelligence service receives the responses from the corresponding agents of the one or more agents and stores the response in association with the corresponding agent and the request in the storage resource. As mentioned above, this storage resource may be accessed during subsequent requests to determine whether a response already exists that could satisfy the query. The response information stored in the storage resource can also be used to facilitate identifying an appropriate agent to message.

The content creation application may automatically receive or request to receive the responses from the intelligence service and can insert the response into the document tied to the corresponding inline note.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A hybrid intelligence approach to eliciting knowledge for inline notes is described. Hybrid intelligence, also referred to as hybrid-augmented intelligence, refers to the combination of human and machine intelligence, where both human and machine intelligence are used to address a problem. The hybrid intelligence can be used to train the artificial intelligence. The described systems and techniques provide intelligence support for filling in content in a document that was marked in some manner to be filled in later. In this manner, the intelligence feature provides assisted content authoring.

The hybrid intelligence approach to eliciting knowledge for inline notes leverages both person and bot agents, including the author of the inline note, to request responses on behalf of a user in a document and provide the responses for direct insertion into the document having the inline note.

A bot agent, or "bot", is a term for a service (for an application) that interacts with users. Conversational interfaces are commonly known as "chatbots" and, in some cases, virtual/digital assistants such as MICROSOFT CORTANA, APPLE SIRI, SAMSUNG BIXBY, AMAZON ALEXA, and GOOGLE ASSISTANT may be considered to be a form of a chatbot or bot. Bots can communicate and otherwise interact with users using text, cards, speech, and even images. Bots can have varying levels of complexity from a simple pattern matching for response to a complex integration with existing services, providing business logic, natural language understanding, and other services.

An inline note is a placeholder for the content to come, and, instead of simply being a "note to self" that requires manual reminders to review and fill out, the described systems and techniques supplement this field with intelligence. The subject inline notes provide a placeholder in the document that can be filled in, not only from within the document, but also via mobile applications. In addition, the subject inline notes can support delegation to others besides the author of the inline note as well as machine intelligence that may be able to fill in the inline note.

Advantageously, simple triggers, mechanisms to elicit content and actions from other users on a canvas or mobile, as well as task functionality can be integrated with word processing and other content creation applications. Not only is it possible for a user to obtain help with a document without having to actually share the document itself, users are able to contribute to others' documents without knowing it is going directly into the document (or what else it may contain). Indeed, users who receive requests for responses may not have access to the document or even be provided context for the request.

Figure 1:
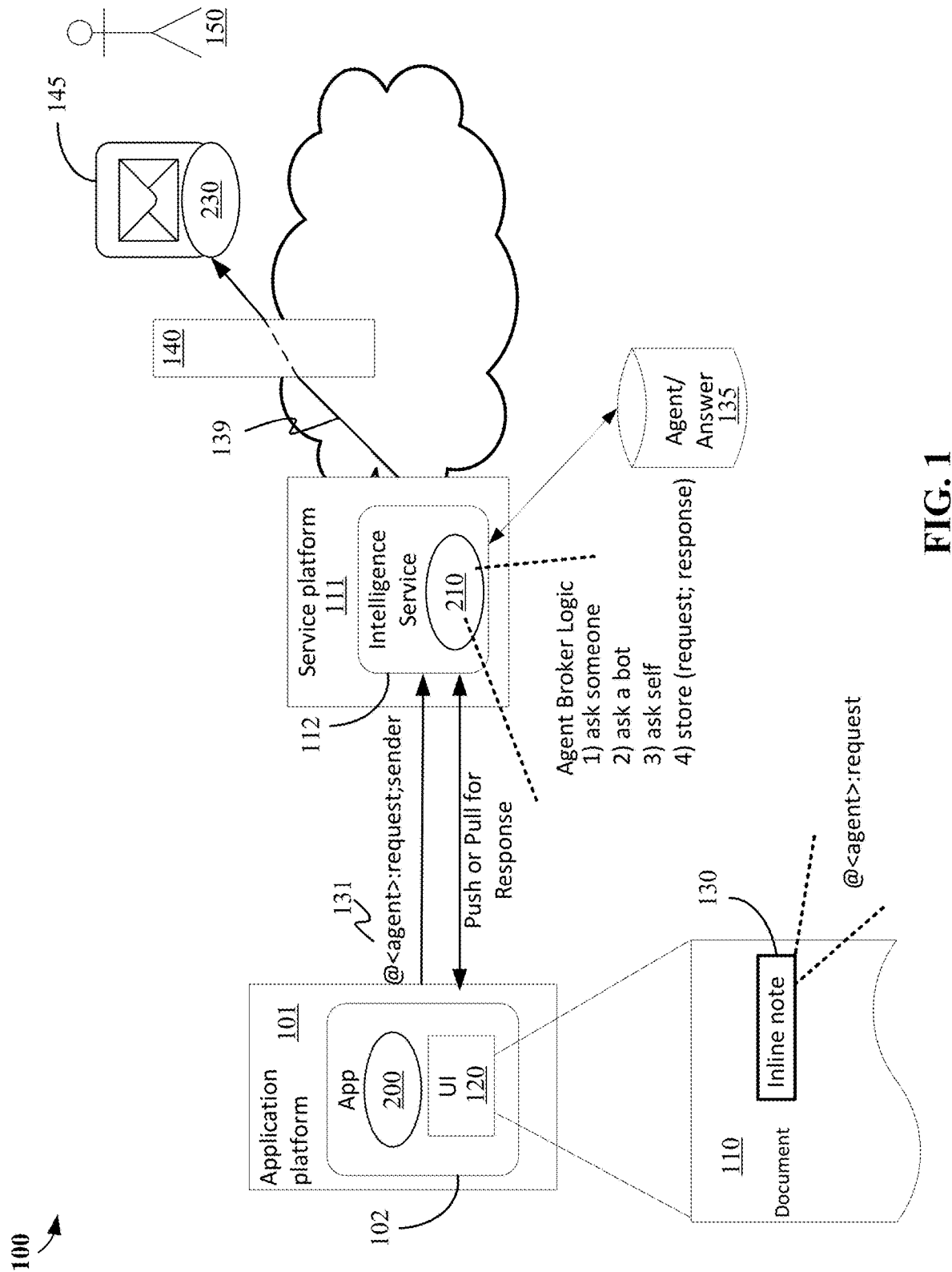
FIG. 1 illustrates an example operating environment for hybrid intelligence approach to eliciting knowledge for inline notes.
Figure 2A:
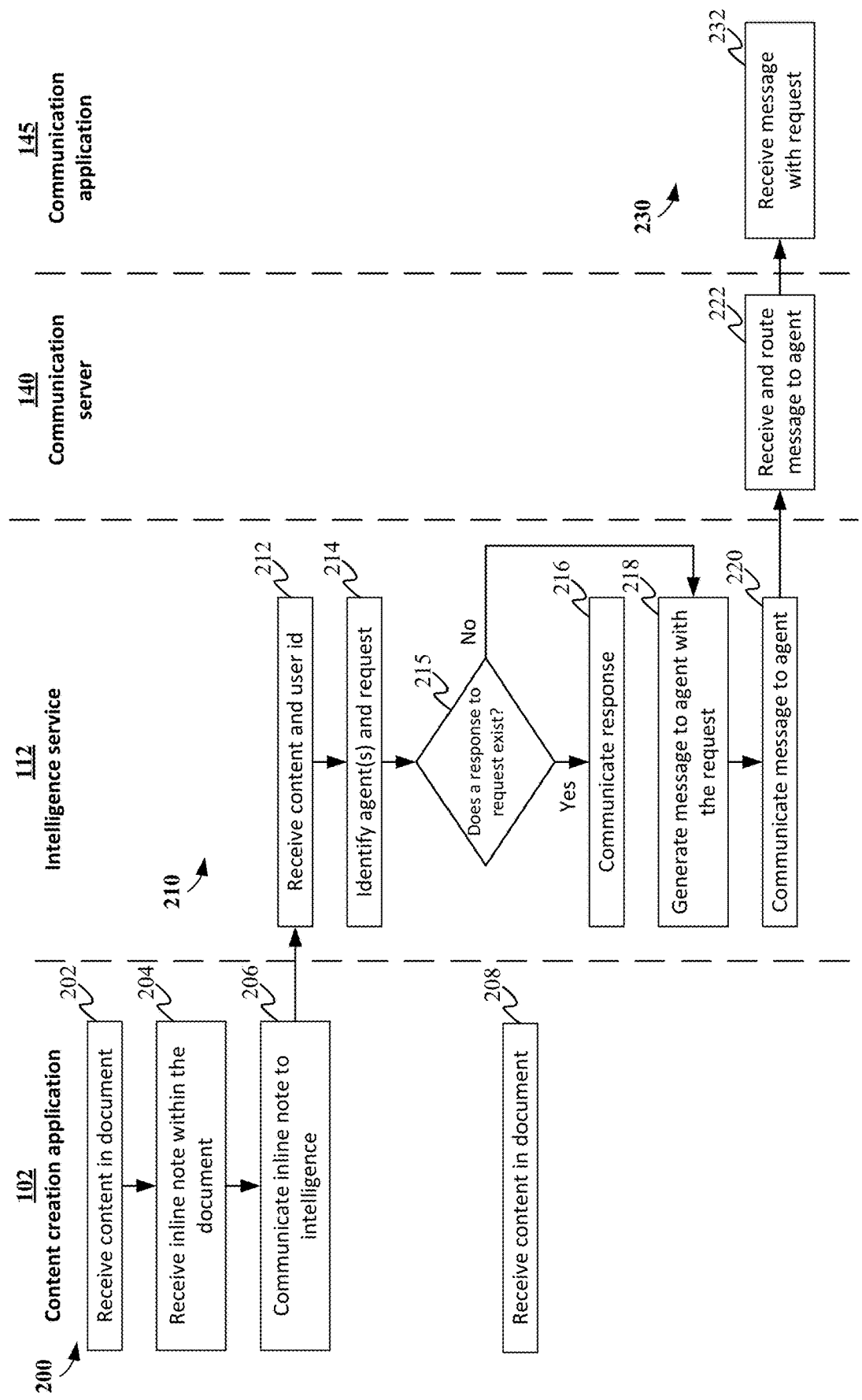
FIGS. 2A and 2B illustrate example processes for the hybrid intelligence approach to eliciting knowledge for inline notes.
Figure 2B:
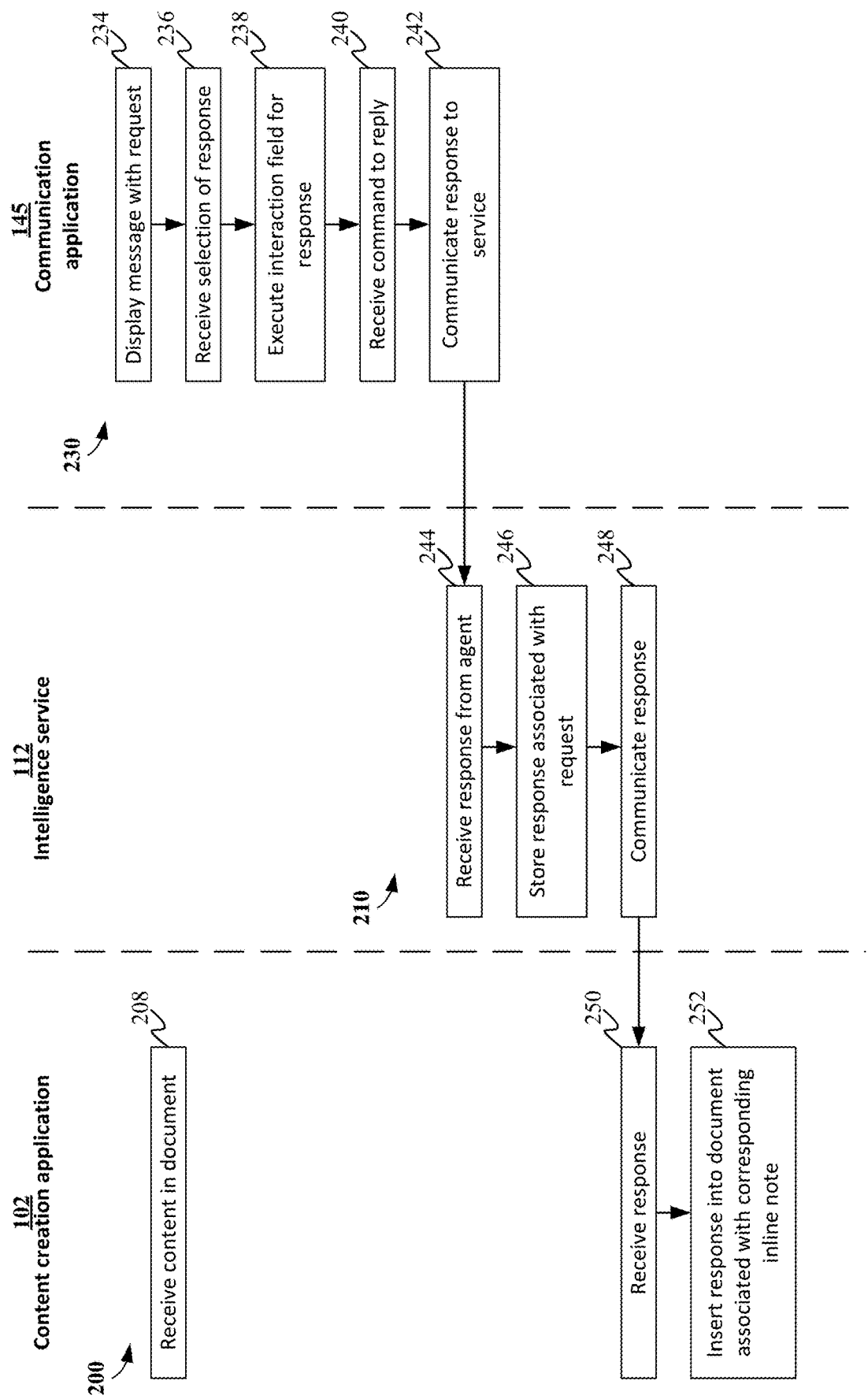

FIG. 1 illustrates an example operating environment for hybrid intelligence approach to eliciting knowledge for inline notes. FIGS. 2A and 2B illustrate example processes for the hybrid intelligence approach to eliciting knowledge for inline notes. The operating environment 100 shows service architecture and certain associated operational scenarios demonstrating various aspects of the hybrid intelligence approach, providing assisted content authoring. The service architecture includes application platform 101 and service platform 111. Local application 102 is executed within the context of application platform 101, while intelligence service 112 is hosted by and runs within the context of service platform 111.

In some cases, local application 102 may be considered remote from intelligence service 112 in that each are implemented on separate computing platforms. In such situations, local application 102 and intelligence service 112 may communicate by way of data and information exchanged between application platform 101 and service platform 111 over a suitable communication link or links (not shown). In other cases, the features and functionality provided by local application 102 and intelligence service 112 can be co-located or even integrated as a single application.

Figure 7:
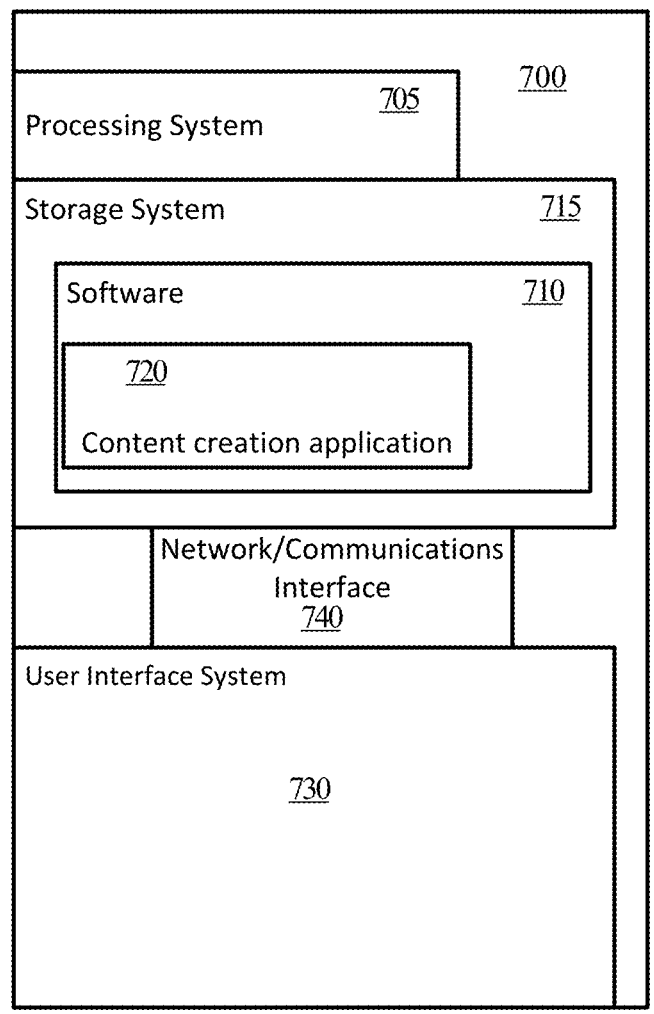
FIG. 7 illustrates components of a computing device that may be used in certain embodiments described herein.

Application platform 101 is representative of any physical or virtual computing system, device, or collection thereof capable of hosting local application 102 (and capable of employing process 200 described with respect to FIGS. 2A and 2B. Examples include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing device 700 illustrated in FIG. 7 is representative.

Local application 102 is representative of any software application, module, component, or collection thereof, capable of implementing an intelligent inline note feature. Examples of applications in which the intelligent inline note feature may be provided include, but are not limited to, note-taking applications, freeform digital canvases, word processing applications, spreadsheet applications, presentation applications, blogging and micro-blogging applications, social networking applications, gaming applications.

Local application 102 may be a browser-based application that executes in the context of a browser application. In some implementations, local application 102 may execute in the context of or in association with a web page, web site, web service, or the like. However, local application 102 may also be a locally installed and executed application, a streamed application, a mobile application, or any combination or variation thereof. Local application 102 may be implemented as a standalone application or may be distributed across multiple applications.

Figure 8:
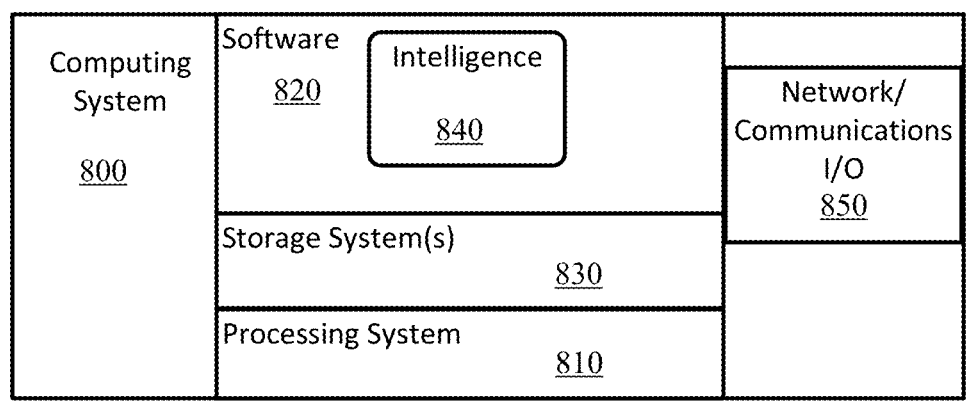
FIG. 8 illustrates components of a computing system that may be used in certain embodiments described herein.

Service platform 111 is representative of any physical or virtual computing system, device, or collection thereof capable of hosting all or a portion of intelligence service 112 and implementing all or portions of process 210 described with respect to FIGS. 2A and 2B. Examples of service platform 111 include, but are not limited to, smart phones, laptop computers, tablet computers, desktop computers, hybrid computers, gaming machines, smart televisions, entertainment devices, Internet appliances, virtual machines, wearable computers (e.g., watch, glasses), as well as any variation or combination thereof, of which computing device 700 illustrated in FIG. 7 is representative. Further examples of service platform 111 include, but are not limited to, web servers, application servers, rack servers, blade servers, virtual machine servers, or tower servers, as well as any other type of computing system, of which computing system 800 of FIG. 8 is representative. In some scenarios, service platform 111 may be implemented in a data center, a virtual data center, or some other suitable facility.

Intelligence service 112 is any software application, module, component, or collection thereof capable of providing an intelligence service to local application 102 and communicating with agents. The service 112 can include a number of REST endpoints, providing application programming interfaces (APIs). For example, the service 112 can include an inline note API for receiving content of an inline note and a user identifier associated with an author of the inline note to perform the assisted content authoring. In some cases, context (e.g., document and/or user information) can be communicated via the inline note API. Furthermore, a response API and a forward API may be supported to enable the direct feedback from messages sent over various communication channels. In addition, the service 112 can include APIs such as a document status API for requesting and receiving status information on outstanding responses to requests for a particular document or user identifier and/or a user status API for requesting and receiving information on outstanding requests to a particular user. Example use of the document status API and user status API include, for example, a task application such as WUNDERLIST or TRELLO, calling the user status API to obtain notification information (e.g., outstanding requests) for that user or the document status API to obtain a status of who has replied and who hasn't for a particular document.

An API is generally a set of programming instructions and standards for enabling two or more applications to communicate with each other and is commonly implemented as a set of Hypertext Transfer Protocol (HTTP) request messages and a specified format or structure for response messages according to a REST (Representational state transfer) or SOAP (Simple Object Access Protocol) architecture.

In operation, local application 102 can render document 110 in user interface 120. The parts of the document that the user can view and interact with to create and edit content can be considered a "canvas". Document 110 may be stored locally, on the "cloud," on an enterprise server, or a combination thereof. In some cases, the document 110 may not be permanently saved anywhere. Document 110, when first created, may initially be blank. In some cases, document 110 contains content a user has already authored. An intelligent inline note feature of application 102 can receive an inline note 130 with an implicit agent request or an explicit agent request (e.g., "@<agent>: request") has been entered in the document 110, and can communicate the agent request to the intelligence service 112, for example, via an API (e.g., an inline-note API of the intelligence service 112).

There are a number of mechanisms to call out other people when working within a canvas. For example, "@mentions" can be used in email, notes, and comments to direct comments to a particular person. These @mentions are helpful in generating a conversation around a topic. Advantageously, the subject inline notes and intelligence service can leverage this known trigger text, as well as other terms such as "note", "todo", "note to self", to identify a named or unnamed agent (person or bot).

The API communication 131 can include one or more named agents (person or bot), the request, and sender information (e.g., the user identifier of the author and optionally document information or identifier and/or application identifier). Other information may be communicated as well or as an alternative. It should be understood that although the term "document" is used, document 110 may represent any file formats/types suitable for content authoring.

In more detail, turning to FIG. 2A, process 200 can be carried out by the application 102. For example, content creation application 102 can receive (202) content in the document 110; and receive (204) an inline note 130 in the document 110. The inline note may be explicitly or implicitly received.

The inline note can be explicitly received within the document, for example, when a trigger indicating content for the inline note is received. The trigger can include one or more specified characters, symbols, gestures, or combination thereof. For example, the trigger can include an "@"-symbol mention. In some cases, the trigger includes a sequence of characters, for example, a single or double parenthesis followed by an "@" symbol. In some cases, the inline note trigger can be detected when certain terms or phrases are used, which can be considered content classified as an inherent trigger term. Examples of content that may be classified as the inherent trigger term include, but are not limited to: note to self, ask, or insert. In some cases, the terms may change or be updated based on user preferences and/or learned over time. The behavior that defines inherent trigger terms may be identified using a personalized machine learning algorithm trained to detect a particular user's inline note behavior.

In addition to identifying trigger words, symbols, and characters, inline notes may be triggered by an explicit command to insert an inline note. In some cases, an inline note commanding can be received via an interface for receiving natural language statement of intent (e.g., as available using the TellMe service, an example of which can be found in MICROSOFT OFFICE labeled "Tell me what you want to do"). In various implementations, the application can monitor for the appropriate content or command. In addition, the application can signal to the user that the content is part of an inline note, for example, through highlighting or other special formatting. An example scenario involving detecting inline notes is described with respect to FIGS. 4A-4C.

After the inline note is received and, in some cases, after a user exits the inline note (e.g., completes the note), the application 102 can communicate (206) the inline note (e.g., as API communication 131) to the intelligence service 112. The communication (e.g., 131) can include content and a user identifier of the author of the inline note (and optionally document and/or user context). It should be understood that the content of the note may include images, URLs, and other content instead of or in addition to text. The content can include directed requests, which may name one or more agents or otherwise provide sufficient information to identify an appropriate agent (e.g., "I need someone from legal to look at this" or "get a temp worker to fill this in" or "ask that bot with the images"). In some cases, the requests may be undirected—and just include the request (e.g., "get the information on the Lamassu"). As mentioned above, other information may also be included with the request.

In some implementations, the communicating of the content of the inline note and the user identifier associated with the author of the inline note to the intelligence service comprises sending the content and the user identifier to the API of the intelligence service in a format including agent name (or sufficient information to identify an agent), request, and sender, the agent name and request being from the content of the inline note and the sender being the user identifier.

The timing for the API call may depend on particular implementation. For example, in some cases, multiple requests will be batched such that the inline note is communicated to the intelligence service after a certain number of inline notes are detected or after a certain period of time passes (e.g., in an asynchronous manner). The multiple requests can be batched over a large corpus.

Content authored by the user can continue to be received (208) in the document while the intelligence feature is being carried out.

Figure 3:
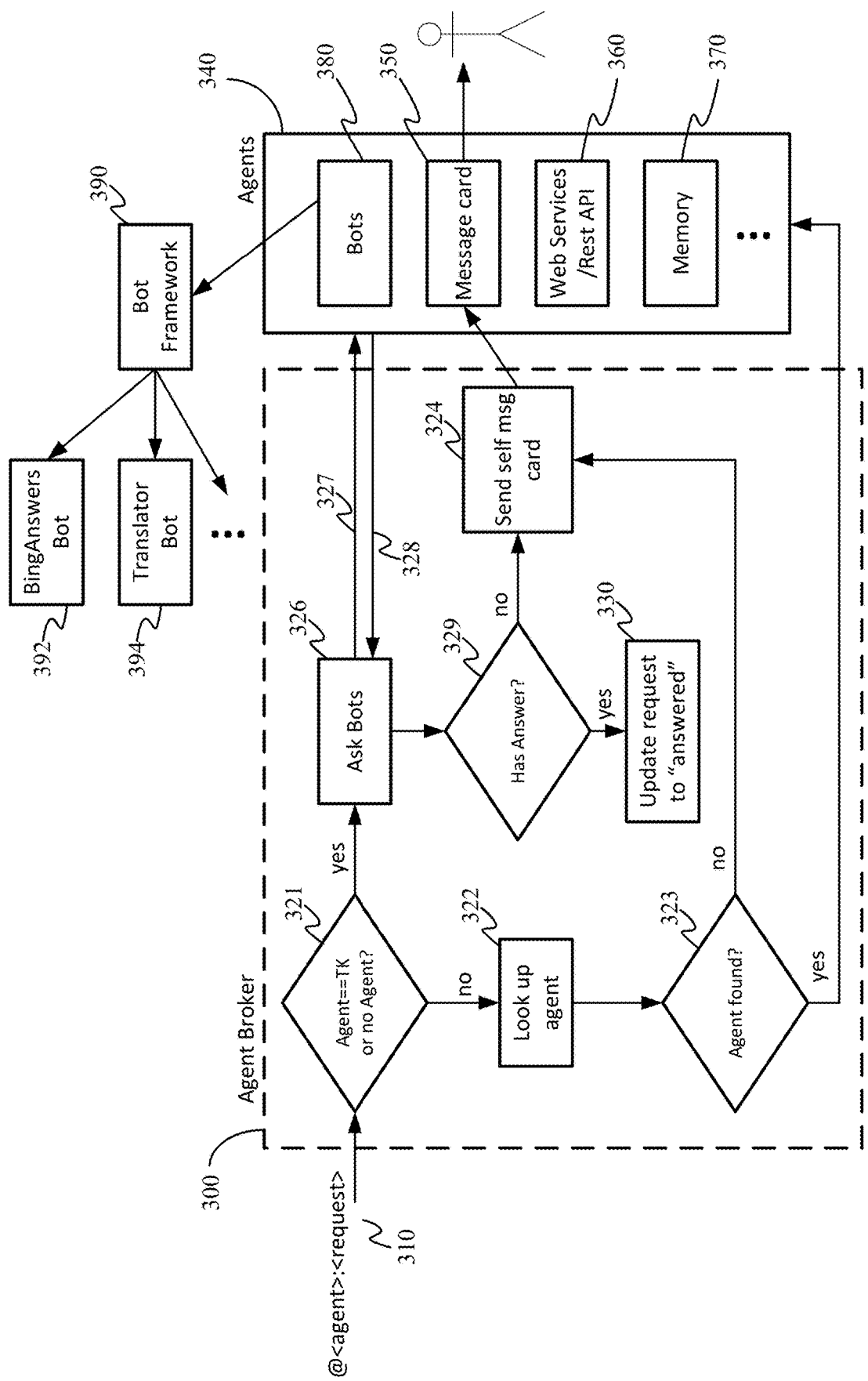
FIG. 3 illustrates an example agent broker logic of an intelligence service.

Process 210 can be carried out at the intelligence service 112 by receiving (212) the content and user identifier (e.g., communication 131). The service, through, for example agent broker logic, can identify (214), from the content of the inline note (and any context provided therewith), agent(s) and a request. An example implementation of the logic is shown in FIG. 3. The identified agent or agents may be the author, one or more person agents, one or more bot agents, or a combination thereof. Person agents and bot agents may be named, inferred, suggested, or a member of a gig economy.

A "gig economy" generally refers to business models that rely on an on-demand or independent contractor community. In this context, a gig is a project or task for which a worker is hired, often through a digital marketplace, to work on demand. Platforms that facilitate the gig economy are those that connect independent workers for short-term engagements with an organization or a specific project. These platforms make it possible to crowdsource products and services from a wide community of people. Example gig economy platforms include ConstantContent and Moravia.

The service can identify the agent, for example, by performing a lookup of the contact information of the named agent; by analyzing context of the request and/or document; or by determining that the inline note is a self-note and the agent is the author.

The logic at the service can determine (215) whether a response to the request already exists (e.g., by searching a storage resource 135 storing agent and answer information). If a response already exists, for example due to a previous request and response (which may be from a same identified agent), the response can be communicated (216) or otherwise indicated as available to the content creation application 102.

If a response does not already exist, then a message can be generated (218) to an agent with the request. In some cases, there can be responses or content in the storage resource 135 that may be relevant to the request. Such relevant information may be used to provide extra context to the author or the agents. For example, a message may be generated that includes information from previous interactions that can help the agent respond better and quicker. In addition to information from previous interactions, interactions with others as well as information or metadata from the document itself may be provided either directly to the agent or used by the intelligence service to identify potential relevant responses or content that are then provided to the agent along with the request. The additional information may be in the form of suggested potential answers.

Referring to both FIG. 1 and FIG. 2A, the generated message 139 can be communicated (220) to the agent via a communication server 140, which receives and routes (222) the message to the agent. The communication server 140 may be associated with any appropriate communication channel, for example supporting communication of a text message, an email (e.g., as an SMTP server), an instant message (e.g., APPLE iMessage, WeChat, VIBER, SKYPE instant message, FACEBOOK Messenger), a group chat message (e.g., MICROSOFT Teams), or a group channel conversation (e.g., SLACK), as non-limiting examples.

The agent may receive the message with the request via a communication application 145, within which process 230 is carried out for human agents 150. In addition to communication applications associated with the above-mentioned communication channels, other platforms and applications (e.g., crowd-source and/or gig economy platforms, or note taking applications, task applications, or other productivity applications) may be used to receive and/or display the messages for human agents. Indeed, the message may be accessed by applications that include an inline note feature for a user to communicate with themselves—and may or may not also support communication between people. For example, the application—with inline note feature—can include a mobile application that pulls (or receives) a person's inline notes and makes those notes available to the user in a personal feed. Such applications can enable a user to access and address their own notes and, in some cases, access and address the notes others have assigned them. It should be understood that the inline note feature could be configured as a stand-alone application, a widget, or integrated with another application.

Figure 9:
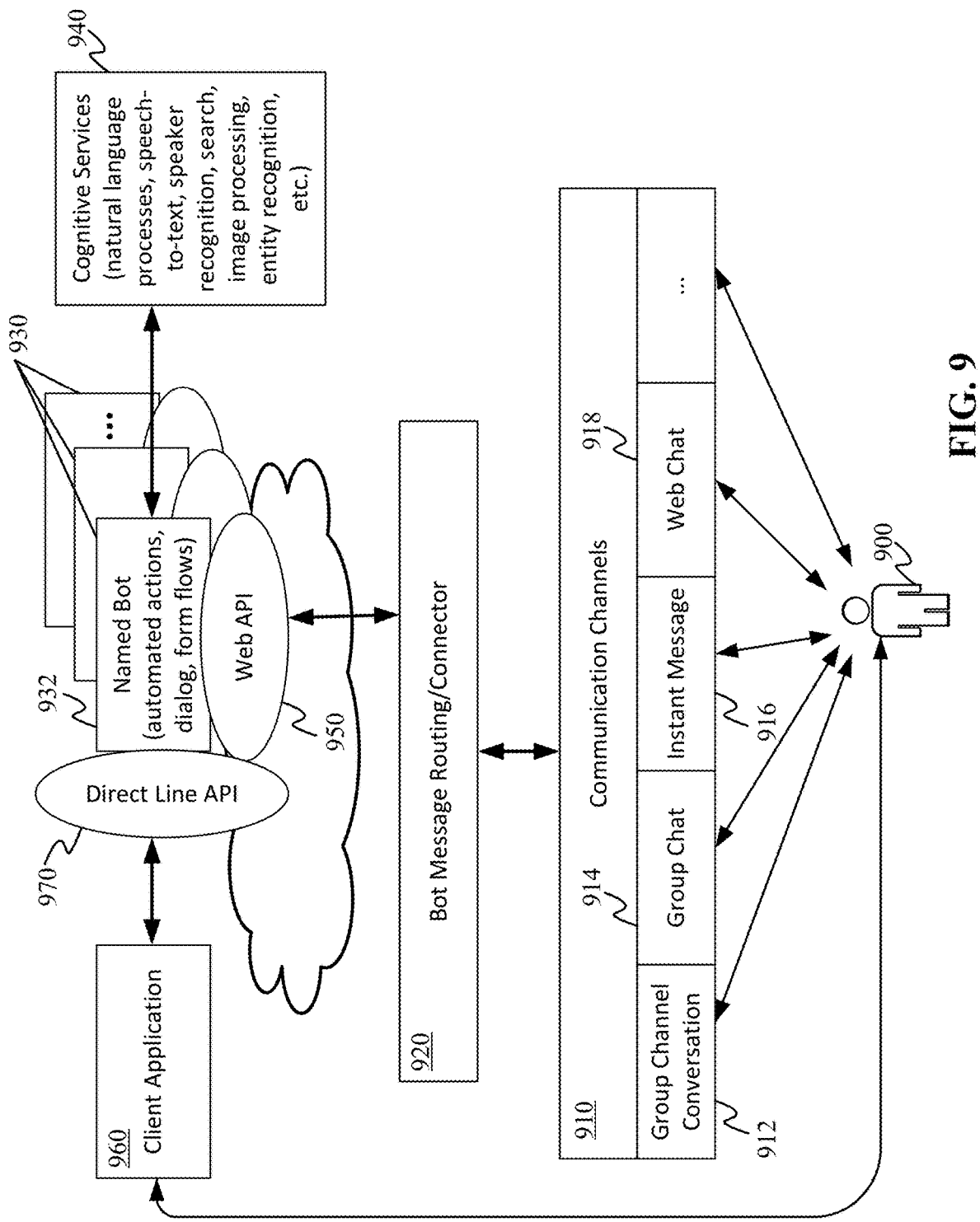
FIG. 9 illustrates an example bot framework environment.

When the message is communicated to a bot agent, the message and response may be communicated via the appropriate bot framework. FIG. 9, described in more detail herein, illustrates an example bot framework environment. In some cases, the message may be communicated to other services that may or may not be considered "bots", for example services that include human components (e.g., where a bot acts as an intermediary for communication between two humans, including live chat support) and/or services that perform more complicated tasks (e.g., of a full application).

It should be noted that in the case that there already exists a response, the intelligence service may omit generating (218) and communicating (220) the message or may still generate (218) and communicate (220) the message, but provide both responses to the author of the inline note. In some cases, the information in the storage resource can be used to assist the responding agent with additional context or suggested responses for the responding agent to compose a response. Indeed, in some of such cases, the system can extract information or metadata from the document and provide this additional information in the message as supporting information for the responding agent. In other of such cases, the system can use the information stored in the storage resource to suggest potential answers to the responding agent.

Referring to FIG. 2A, process 230 may include displaying (234) the message with the request via the communication application 145 executing on a computing device (such as device 700 described with respect to FIG. 7). The message can include a field for direct reply to a particular document, commands or links, for example, to respond and/or to forward the message to another person or bot (see example scenario illustrated in FIGS. 5A-5D). In response to receiving (236) a selection of a response (e.g., via interaction with a field or clicking on a respond command), an interaction field can be executed (238). The interaction field may open in a new window, in a window within the displayed message, or in a pane as some examples. A user can input their response into the interaction field. A command to reply can be received (240) in order to cause the response to be communicated (242) to the intelligence service 112. As mentioned above, the intelligence service may have provided additional information beyond just the text of the request, and, in some cases, may include suggested answers that can be selected and/or elaborated on by the recipient of the message.

Returning to process 210, the intelligence service 112 can receive (244) the response from the agent (e.g., 150) sent, for example, via the interaction field of the message. Of course, in some cases, instead of a link or command initiating a communication between the agent and the intelligence service, the response from the agent may be via the communication application (and corresponding communication server) such that the intelligence service 112 receives a message via email, instant message, and the like.

The intelligence service stores (246) the response associated with the request, for example in the storage 135. The response can be communicated (248) to the content creation application 102 via pull or push mechanisms. It should be understood that the content of the response may include images, URLs, ink, and other content instead of or in addition to text.

Returning again to process 200, the content creation application 102 can receive (250) the response and insert (252) the response into the document 110 associated with the corresponding inline note 130.

FIG. 3 illustrates an example agent broker logic of an intelligence service. In this example implementation, the intelligence service leverages a bot framework, which may be implemented such as described with respect to FIG. 9, to provide responses to inline notes—without requiring a named bot as an agent (e.g., for undirected requests). Referring to FIG. 3, an agent broker 300 can receive the content 310 of the inline note and perform logic such as determining (321) whether the content of the inline note includes a directed request, for example with a named agent (explicitly named or able to be inferred). For a case where the named agent is not explicitly named, the service may access one or more resources to determine the intended target, for example. If the content of the inline note is determined to include a directed request, the system can perform (322) a look up of a named agent to obtain contact information of the named agent (e.g., by accessing a contact resource), and can determine (323) whether the agent was found during the look up. Here, named agents can also include those not directly named, but available through a crowd-source platform or community platform that is named (explicitly or implied). For the case where the agent is found (from operation 323), the message for the named agent is communicated over the communication channel using the contact information of the named agent. If the agent is not found during the look up, the agent can default to the author of the inline note and a message may be sent (324) to "self" using the contact information (message card 350) of the sender user. For asking self, the message card 350 can indicate the user's preferred mode for sending the notification. The message may be sent via any suitable communication channel and even to a standalone app on a user's mobile phone.

If, during the determining (321) whether the content of the inline note includes a named agent (person or bot), the result is that the inline note does not include a named agent (either because of being considered a note to self or because the inline note explicitly indicates it is a note to self), the agent broker can send (326) a request 327 to, for example, a bot framework 390 (e.g., with pathways to bots such as TellMe Bot, BingAnswers Bot 392 and a Translator Bot 394) to determine (329) whether any existing bots (e.g., a set of bots that are known—e.g., registered—by the framework) can provide response 328. If one or more bots have an answer, the request can be updated (330) to "answered" and made available to the author (e.g., via a push or pull scenario). If there is no answer by the bots that satisfies the request, a message may be sent (324) to "self". Of course, other implementations may not send the request 327 to bots and simply generate the self-message card as mentioned in operation 324; and yet other implementations may send the request 327 to bots even when there is a named agent. In some implementations, if no agent is named in the note, the system can identify one or more people or bots who may be able to satisfy the request, for example, by looking up prior requests and responses and determining who may have knowledge of relevant topics.

Also shown in the operating environment of FIG. 3, known agents 340 can be stored and used by the agent broker to look up the agent 322 or identify bots 380 when asking bots 326. Further, although not shown in the agent broker logic, web services and rest APIs 360 may be queried. In addition, information may be stored in memory 370 and used to answer requests (such as used by operation 215 described with FIG. 2A). The memory 370 can store previous requests, the agent(s) asked, and corresponding responses (as well as who or what made the request). User privacy can be maintained according to suitable privacy guidelines. The information stored in memory 370 can be used by the intelligence service as a first place to look when a request is received in order to quickly respond with an answer and/or minimize the number of messages sent to agents. The memory 370 may be queried for whole requests or just terms found in the requests.

The information stored in memory 370 may also be used to supplement responses and/or identify who to route the request to. For example, if a same request was already submitted, the intelligence service can identify who may have answered that request before and either provide that response or provide information back to the user of who may be able to answer that question. This could be useful in an enterprise environment. The intelligence service can use prior results to learn which person to ask for particular questions. For public environments, it may still be possible to send requests to people, but the privacy of who is asking and who is responding can be maintained (and revealed as permitted by the users).

As another example, the stored information can be used to help identify the bots for the triage of which bots have the right answers, for example during the ask a bot operation 326 to identify bots that likely have a response. The storage 370 can also include feedback where multiple responses to a same request are provided to a user and that user selects one or more of the multiple responses as the desired response. This feedback information can be used to rank or improve identifying appropriate agent(s).

Thus, when a request is received that is determined to not include a named agent (person or bot) and/or not be a directed request, the intelligence service can identify appropriate agents and improve who the requests are sent to over time.

Figure 4A:
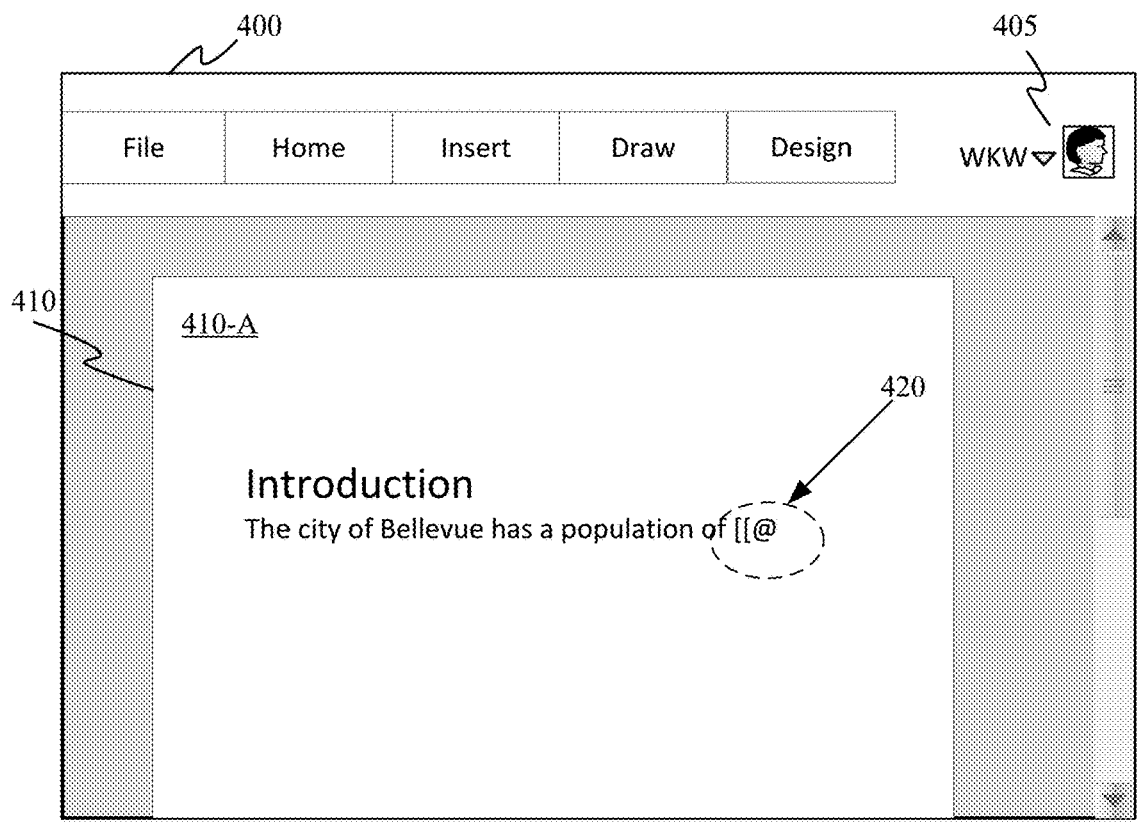
FIG. 4A-4C illustrate an example scenario of a user eliciting knowledge for inline notes from within a content creation application.
Figure 4B:
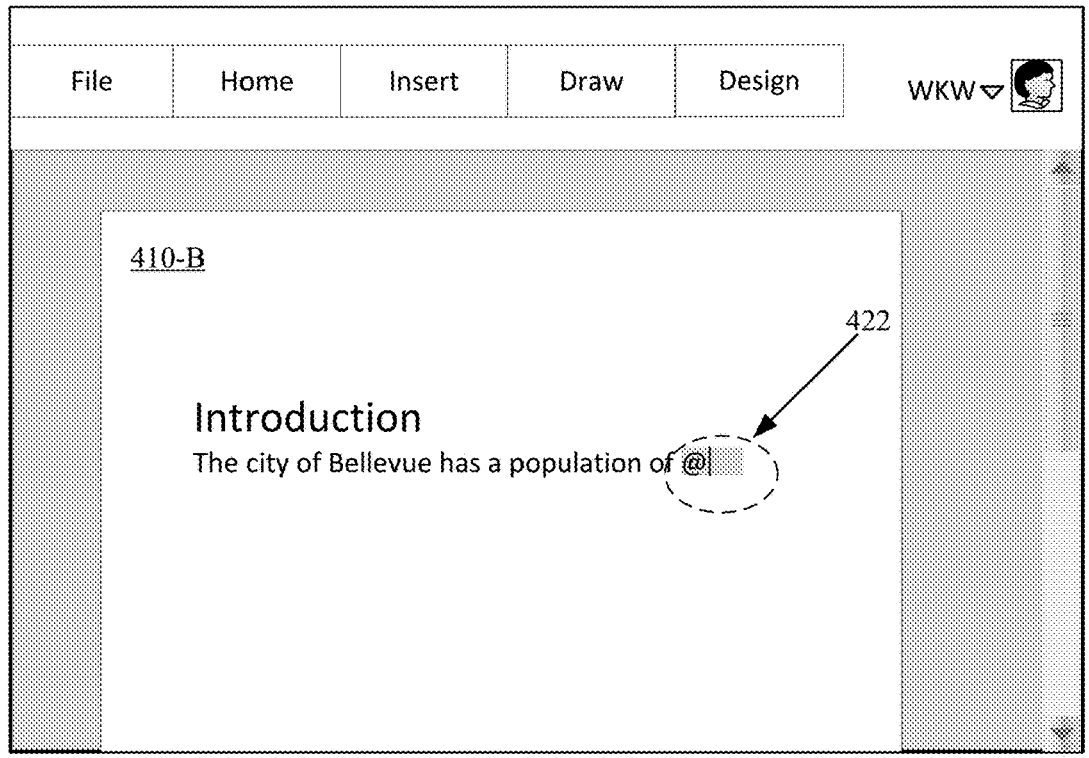
Figure 4C:
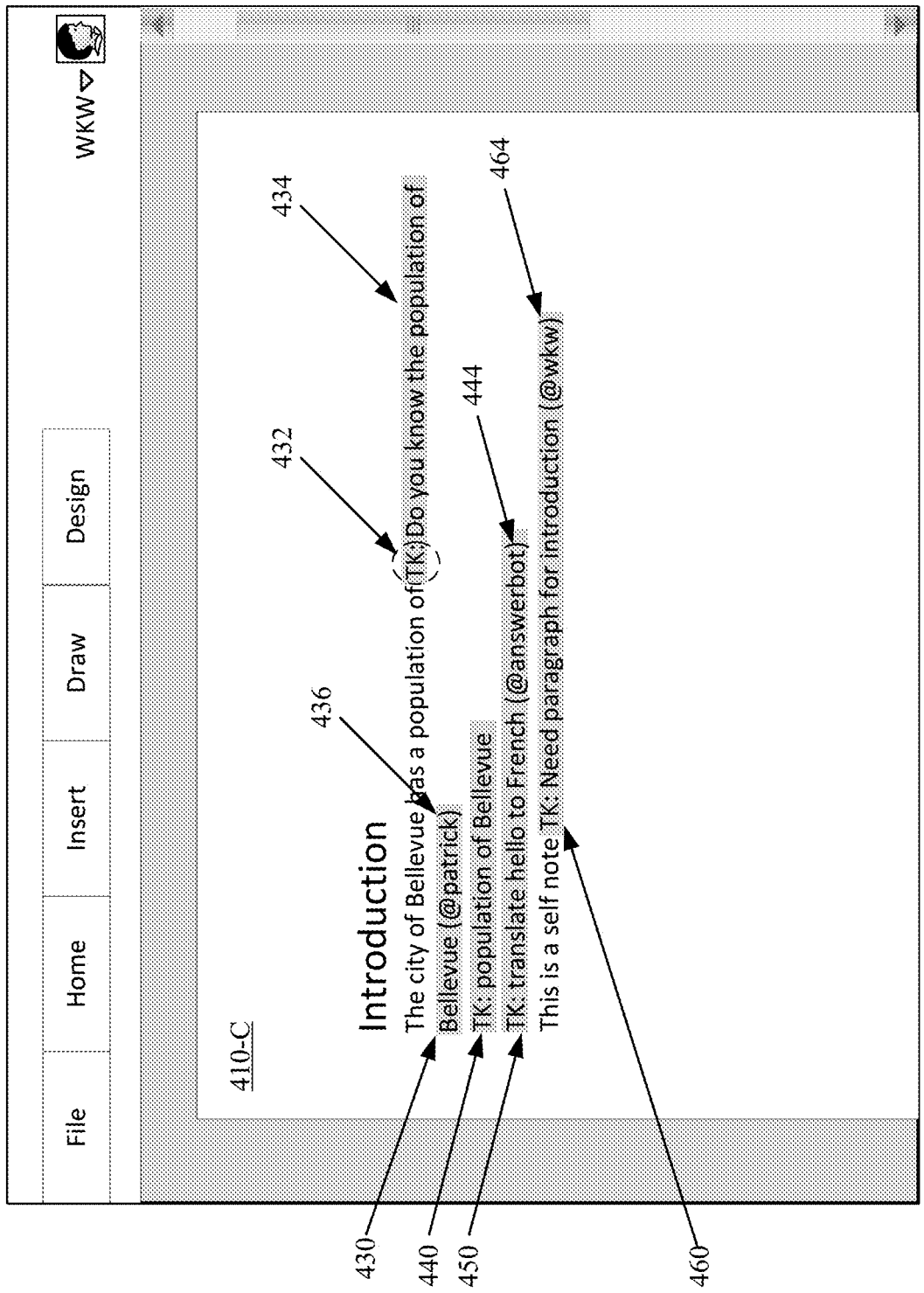

FIG. 4A-4C illustrate an example scenario of a user eliciting knowledge for inline notes from within a content creation application.

Referring to FIG. 4A, a user (e.g., WKW 405) can be creating content within a canvas 410 of a content creation application 400. As shown is the canvas 410 in a first state 410-A where the user has written a header (e.g., "Introduction") and a sentence about the population of Bellevue. To avoid stopping to look up the population of Bellevue, the user can leave themselves an inline note. Here, the trigger text 420 for initiating the inline note is "[[@", which then changes the formatting of the region 422 to indicate the subsequent text is part of the inline note, such as shown in the state 410-B of FIG. 4B. The inline note(s) can be recognized by special formatting. When the user exits the inline note, for example using a closing text of "]]", the application will execute the intelligence (e.g., by sending the content to the intelligence service). The inline note lets the user keep typing in the document.

Referring to FIG. 4C, as shown in the state 410-C, the user has continued typing. The first inline note 430 includes a handle 432 that may have been input by the user to indicate that the following text is part of an inline note, the request 434, and a named agent (in this case Patrick 436, indicated by the @-mention). A second inline note 440 asking about the population of Bellevue is shown without a named agent. As mentioned with respect to FIG. 3, when there is no named agent, the logic can ask bots and/or the user.

Figure 6A:
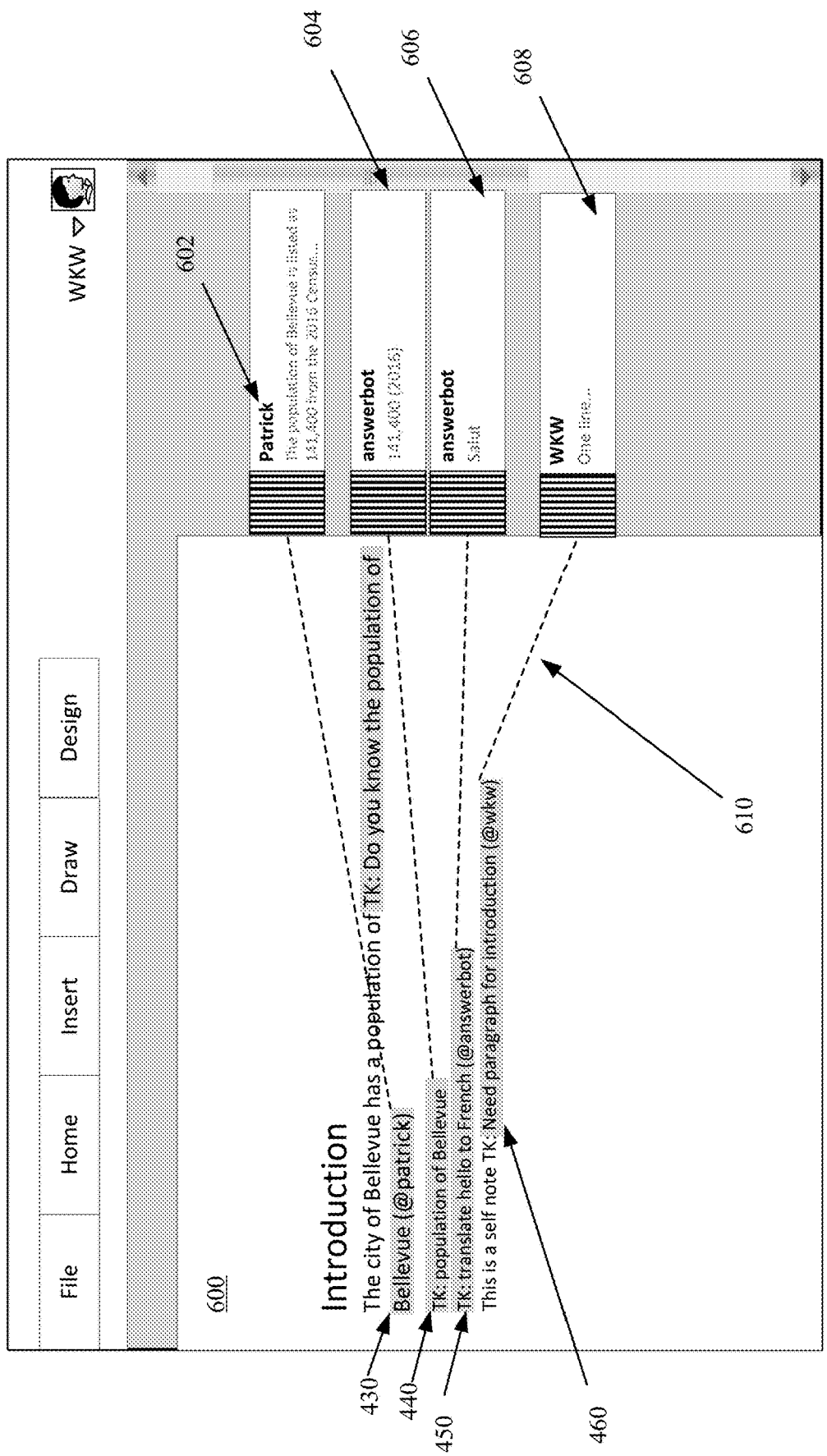
FIGS. 6A and 6B illustrate the example scenario of the results returning to the content creation application.
Figure 6B:
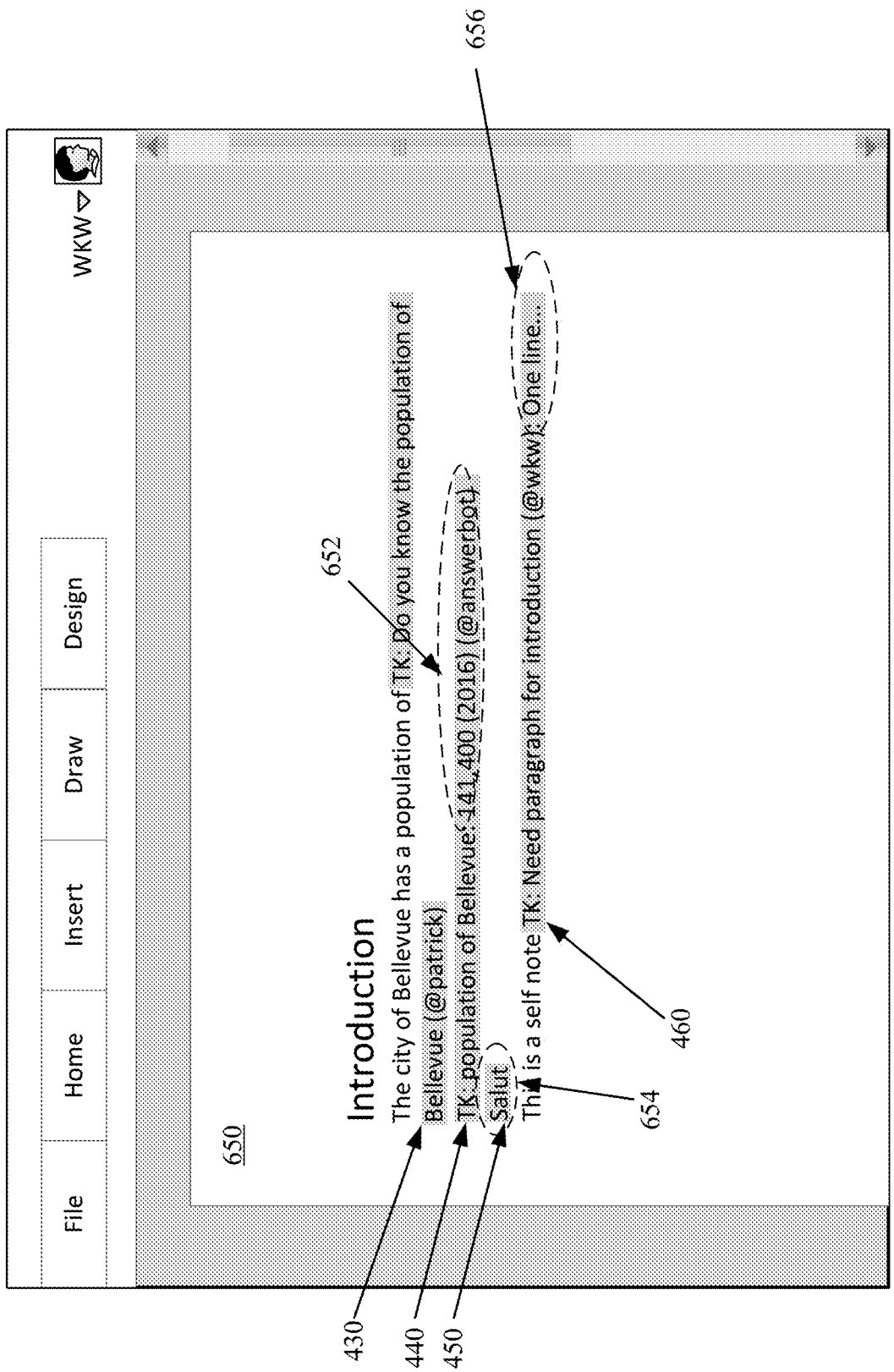

A third inline note asking to translate "hello to French" is included to make a request to a named bot agent "answerbot" 444. Any known (or unknown) bot may be asked and as the user continues typing the bot retrieves the information and the response is inserted into the document (as shown in FIGS. 6A and 6B). In some cases, the intelligence can send the request to one or more bots when there is no Also shown is a fourth inline note 460, which is a note to self (e.g., user WKW 464).

FIGS. 4A-4C illustrate where a user intentionally triggers the inline note functionality with an "@mention" or "ask" or "todo:"; however, in some implementations the inline note functionality can be triggered by words of action or task, such as "find out", "double check this", and the like.

Figure 5A:
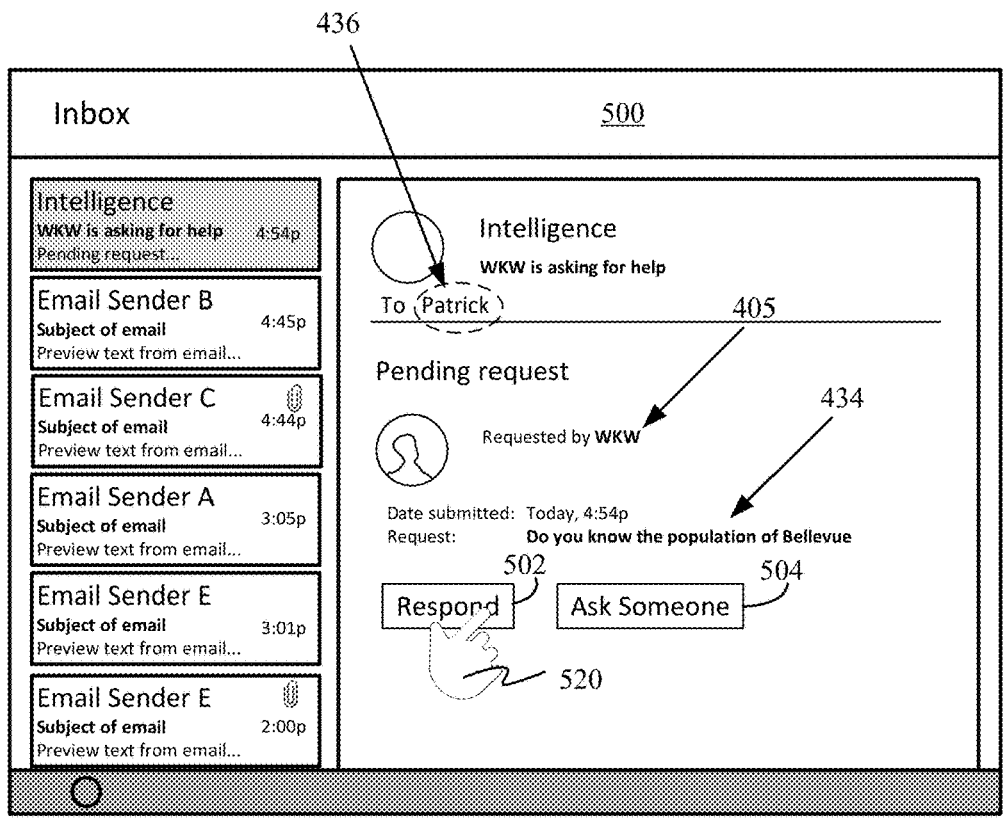
FIGS. 5A-5D illustrate the example scenario for an agent response from within a communication application.

FIGS. 5A-5D illustrate the example scenario for an agent response from within a communication application. Referring to FIG. 5A, the person agent, Patrick 436 receives a message on behalf of WKW 405 from the intelligence service, for example, via email, and can view the message in the email application 500. A similar email could be sent to WKW for the notes-to-self. As can be seen, Patrick does not have access to WKW's document, just the request, and is able to contribute to the document without having to even know it is a particular document or topic. In addition to the request 434, the message can include actions such as respond 502 and forward ("ask someone") 504.

Figure 5B:
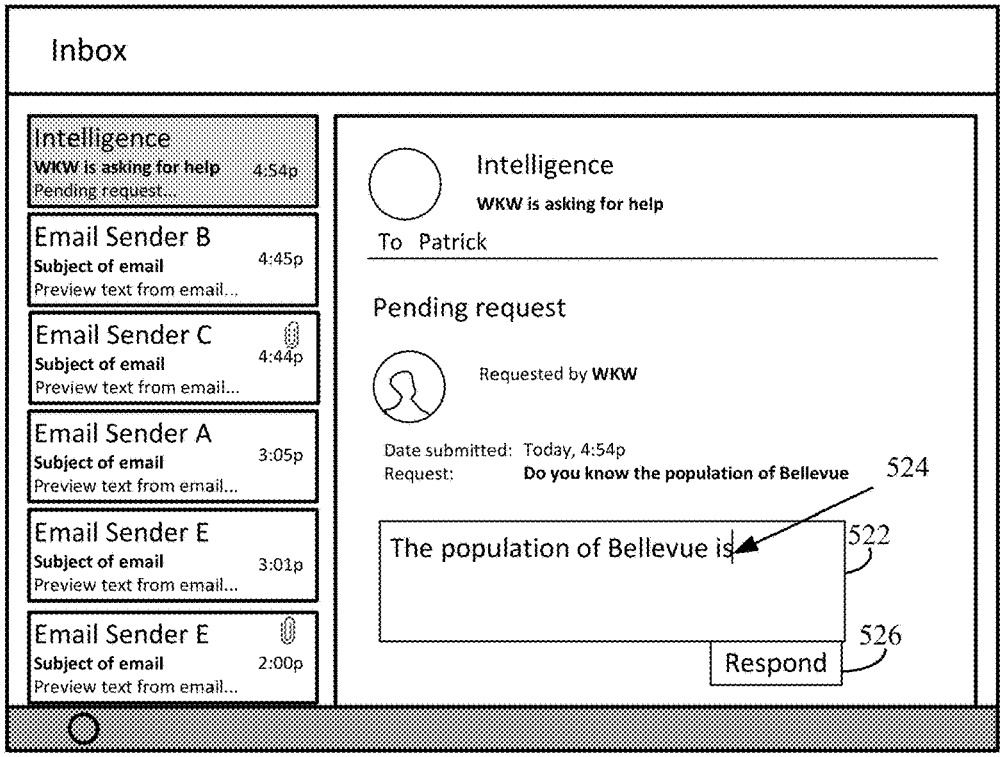

In the illustration of FIG. 5A, Patrick is selecting to respond (520), which can open an interaction field 522 such as shown in FIG. 5B. The user may input their response 524 into the field 522 and select to respond 526 to send the response 524 back to the intelligence service. Of course, in some cases, the field may already be available in the message without requiring an extra step to select the respond 502 command of FIG. 5A. Further, in some implementations, a new window or pane may appear instead of or in addition to the interaction field 522.

Figure 5C:
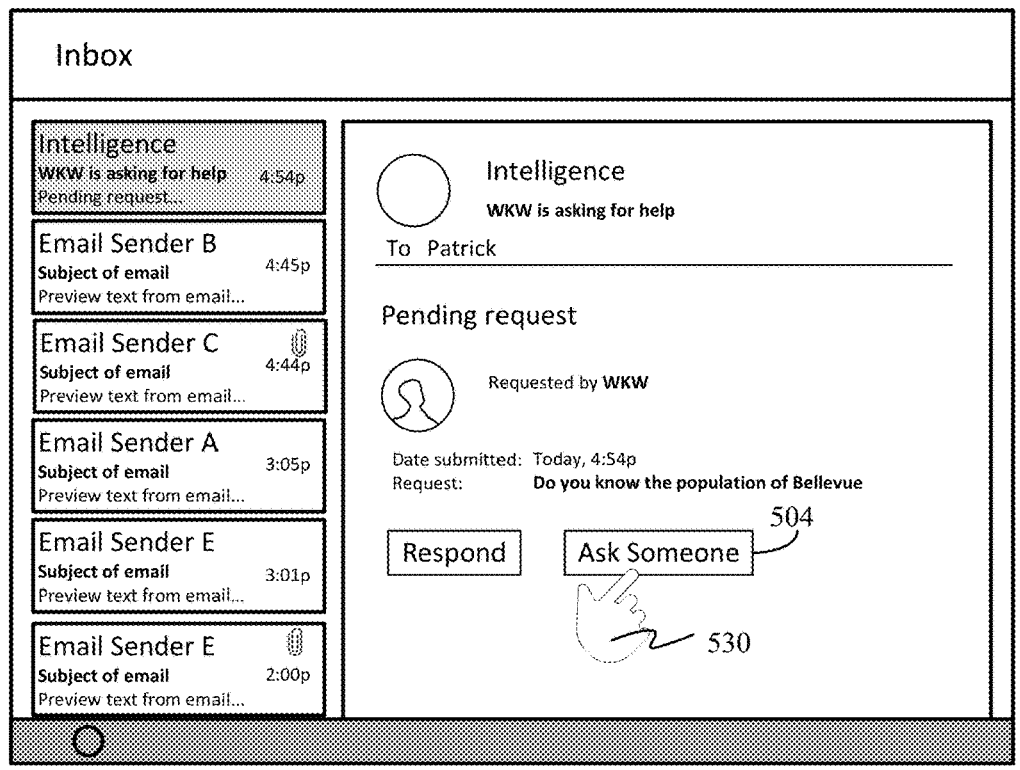
Figure 5D:
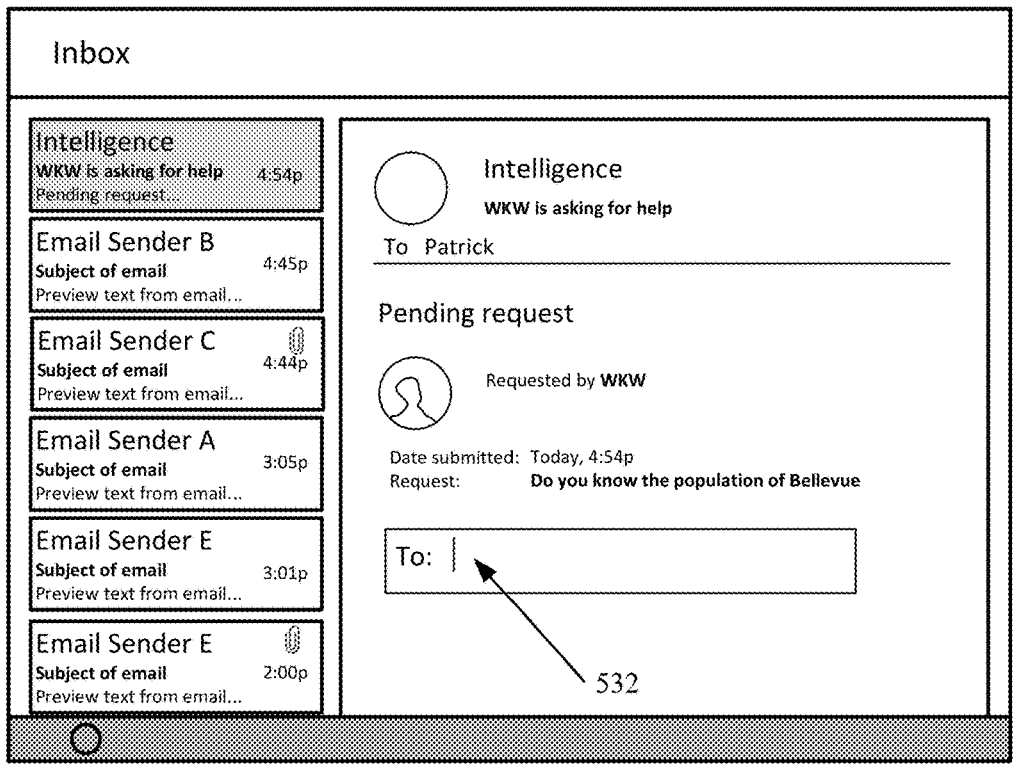

In the illustration of FIG. 5C, Patrick is selecting to forward, or delegate, the request to someone else, for example by selecting (530) to "ask someone" 504, and inputting (532) the contact information or name of that person (or bot), as shown in FIG. 5D. When the intelligence service receives the new name or contact information, the intelligence service can generate a new email or other message to send to the person (or bot or other entity) suggested.

These actions can be tied to APIs of the service, such as a response API receiving responses from an interaction field in the message (the sending of which may be initiated by a separate command after providing an answer in the interaction field as shown in FIG. 5B) and a forward API receiving one or more suggested agents to generate a forwarded communication to the request, the forwarded communication being communicated to each of the one or more suggested agents after being received by the intelligence service. In some cases, the response can be provided by a reply email (or other message type) and not use the special response API.

FIGS. 6A and 6B illustrate the example scenario of the results returning to the content creation application. Referring to FIG. 6A, the responses can be inserted into the document tied to the inline note in the form of comments anchored to the corresponding inline note. Here, the canvas 600 shows the inline notes in a similar state to that in state 410-C of FIG. 4C, but at a time after all responses have been received. The responses can appear in the document as they are received by the intelligence service and communicated via the pull or push mechanisms.

In this illustration, Patrick's response is in a comment 602 tied to the first inline note 430, a response in comment 604 is tied to the second inline note 440, the answerbot's response is in a comment 606 tied to the third inline note 450, and WKW's response is in a comment 608 tied to the fourth inline note 460. A visual representation of an anchor line 610 can be displayed, showing that the responses are anchored to their respective inline notes.

As mentioned with respect to FIG. 3, when there is no named agent, the logic can ask bots and/or the user. There may have been a triage process where responses from the bots are queued and ranked based, for example, on confidence. In some cases, more than one answer is shared with the user. For example, some bots may have identified population of Bellevues from different states. Here, the intelligence service asked the answerbot and received the response shown in comment 604.

Referring to FIG. 6B, the responses can be inserted into the document tied to the inline note in the form of replacing all or some of the content of the inline note with the response. The state of the canvas 650 in the example of FIG. 6B is at a time before Patrick has responded to the inline note mentioning him. Here, different types of insertions are shown. For example, the response 652 to the second inline note 430 as well as what entity responded is shown within the inline note. The response 654, providing the translation of "hello" to French is shown completely replacing the third inline note 450. In this example, there is no attribution provided inline (but could be in some cases be included inline and/or shown in a comment). The response 656 providing WKW's comments is shown inline with the fourth inline note 460.

In addition to receiving the responses directly to the document, other applications (e.g., standalone applications or task applications) may access the responses and/or requests via the intelligence service such as via the APIs described above.

FIG. 7 illustrates components of a computing device that may be used in certain embodiments described herein. Referring to FIG. 7, system 700 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, a smart television, or an electronic whiteboard or large form-factor touchscreen. Accordingly, more or fewer elements described with respect to system 700 may be incorporated to implement a particular computing device.

System 700 includes a processing system 705 of one or more processors to transform or manipulate data according to the instructions of software 710 stored on a storage system 715. Examples of processors of the processing system 705 include general purpose central processing units (CPUs), graphics processing units (GPUs), field programmable gate arrays (FPGAs), application specific processors, and logic devices, as well as any other type of processing device, combinations, or variations thereof. The processing system 705 may be, or is included in, a system-on-chip (SoC) along with one or more other components such as network connectivity components, sensors, video display components.

Software 710 may be implemented in program instructions and among other functions may, when executed by system 700 in general or processing system 705 in particular, direct system 700 or the one or more processors of processing system 705 to operate as described herein with respect to processes 100 and 170.

The software 710 can include an operating system and application programs, including a content creation application with inline note feature 720 directing processes as described herein. Device operating systems generally control and coordinate the functions of the various components in the computing device, providing an easier way for applications to connect with lower level interfaces like the networking interface. Non-limiting examples of operating systems include WINDOWS from Microsoft Corp., APPLE iOS from Apple, Inc., ANDROID OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 7, can be thought of as additional, nested groupings within the operating system space, each containing an OS, application programs, and APIs.

Storage system 715 may comprise any computer readable storage media readable by the processing system 705 and capable of storing software 710 including the content creation application with inline note feature 720.

Storage system 715 may include volatile and nonvolatile memories, removable and non-removable media implemented in any method or technology for storage of information, such as computer readable instructions, data structures, program modules, or other data. Examples of storage media of storage system 715 include random access memory, read only memory, magnetic disks, optical disks, CDs, DVDs, flash memory, magnetic cassettes, magnetic tape, magnetic disk storage or other magnetic storage devices, or any other suitable storage media.

Storage system 715 may be implemented as a single storage device but may also be implemented across multiple storage devices or sub-systems co-located or distributed relative to each other. Storage system 715 may include additional elements, such as a controller, capable of communicating with processing system 705.

The system can further include user interface system 730, which may include input/output (I/O) devices and components that enable communication between a user and the system 700. User interface system 730 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 730 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

A natural user interface (NUI) may be included as part of the user interface system 730. Examples of NUI methods include those relying on speech recognition, touch and stylus recognition, gesture recognition both on screen and adjacent to the screen, air gestures, head and eye tracking, voice and speech, vision, touch, hover, gestures, and machine intelligence. Accordingly, the systems described herein may include touch sensitive displays, voice and speech recognition, intention and goal understanding, motion gesture detection using depth cameras (such as stereoscopic or time-of-flight camera systems, infrared camera systems, red-green-blue (RGB) camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Visual output may be depicted on the display (not shown) in myriad ways, presenting graphical user interface elements, text, images, video, notifications, virtual buttons, virtual keyboards, or any other type of information capable of being depicted in visual form.

The user interface system 730 may also include user interface software and associated software (e.g., for graphics chips and input devices) executed by the OS in support of the various user input and output devices. The associated software assists the OS in communicating user interface hardware events to application programs using defined mechanisms. The user interface system 730 including user interface software may support a graphical user interface, a natural user interface, or any other type of user interface. For example, the user interface in which the inline notes and responses are displayed as described herein may be presented through user interface system 730 and graphical user interface(s) displayed therein.

Network interface 740 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

FIG. 8 illustrates components of a computing system that may be used in certain embodiments described herein. Referring to FIG. 8, system 800 may be implemented within a single computing device or distributed across multiple computing devices or sub-systems that cooperate in executing program instructions. The system 800 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 800 can include a processing system 810, which may include one or more processors and/or other circuitry that retrieves and executes software 820 from storage system 830. Processing system 810 may be implemented within a single processing device but may also be distributed across multiple processing devices or sub-systems that cooperate in executing program instructions.

Storage system(s) 830 can include any computer readable storage media readable by processing system 810 and capable of storing software 820. Storage system 830 may be implemented as a single storage device but may also be implemented across multiple storage devices or sub-systems co-located or distributed relative to each other. Storage system 830 may include additional elements, such as a controller, capable of communicating with processing system 810. Storage system 830 may also include storage devices and/or sub-systems on which data such as entity-related information is stored.

Software 820, including intelligence service 840, may be implemented in program instructions and among other functions may, when executed by system 800 in general or processing system 810 in particular, direct the system 800 or processing system 810 to operate as described herein for the intelligence service (and its various components and functionality such as an agent broker 300).

System 800 may represent any computing system on which software 820 may be staged and from where software 820 may be distributed, transported, downloaded, or otherwise provided to yet another computing system for deployment and execution, or yet additional distribution.

In embodiments where the system 800 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 850 may be included, providing communication connections and devices that allow for communication between system 800 and other computing systems (not shown) over a communication network or collection of networks (not shown) or the air.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals. Instead, "storage" media refers to non-transitory media.

FIG. 9 illustrates an example bot framework environment. Referring to FIG. 9, a user 900 can interface with a bot that is part of the bot framework over any communication channel 910 including, but not limited to, group channel conversation 912, group chat 914, instant message 915, web chat 918, and even email or SMS text conversation. The bot frame work includes a bot message routing/connector 520 that supports the communication over the various communication channels 510 and routes messages to an appropriate bot of the known/registered bots 930, for example, named bot 932. The bots 930 can access a variety of cognitive services 940 to support various features such as natural language processes, speech-to-text, speaker recognition, search, image processing, entity recognition, translation, and other features.

Communication with named bot 932 may be via the bot's web API 950 or, in some cases, such as when the user 900 is within a client application 960, the communication with named bot 932 may be via the bot's direct line API 970. The communication between client application 960 and named bot 932 can thus be carried out in a more conventional client/service configuration.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   receiving an inline note within a document, wherein the document comprises content of the inline note and other displayed content;
   communicating the content of the inline note and a user identifier associated with an author of the inline note to an intelligence service;
   at the intelligence service:
      identifying, from the content of the inline note, one or more agents and a request, wherein the content of the inline note comprises an indication of who is to receive the request and text of the request, the identified one or more agents being the author, one or more person agents, one or more bot agents, or a combination thereof,
      generating a message to each of the one or more agents, the message comprising the request,
      communicating the message to the each of the one or more agents over a communication channel,
      receiving, at the intelligence service, a response from a corresponding agent of the one or more agents, and
      storing the response in association with the corresponding agent and the request in a storage resource; and
   inserting the response into the document tied to the inline note.

2. The method of claim 1, wherein receiving the inline note within the document comprises:
   receiving a trigger indicating content for the inline note.

3. The method of claim 2, wherein the trigger comprises one or more specified characters or comprises content classified as an inherent trigger term.

4. The method of claim 1, wherein receiving the inline note within the document comprises:
receiving a command to insert the inline note.

5. The method of claim 1, further comprising:
after identifying, from the content of the inline note, the one or more agents and the request, searching the storage resource for an existing response that satisfies the request.

6. The method of claim 1, wherein the request is a directed request, wherein the identifying, from the content of the inline note, the one or more agents and the request, comprises:
identifying associated contact information for a named agent by accessing a contact resource to look up contact information of the named agent.

7. The method of claim 1, wherein no agent is named in the inline note, wherein the identifying, from the content of the inline note, the one or more agents and the request, comprises:
assigning the author of the inline note as the agent; and
obtaining contact information of the author of the inline note using the user identifier.

8. The method of claim 1, wherein communicating the message to the each of the one or more agents over the communication channel comprises communicating a text message, an email, an instant message, a group chat message, or a group channel conversation.

9. The method of claim 1, wherein inserting the response into the document tied to the inline note comprises: inserting the response into a comment anchored to the inline note.

10. The method of claim 1, wherein inserting the response into the document tied to the inline note comprises replacing all or some of the content of the inline note with the response.

11. The method of claim 1, wherein the communicating of the content of the inline note and the user identifier associated with the author of the inline note to the intelligence service comprises sending the content and the user identifier to an application programming interface (API) of the intelligence service in a format including agent name, request, and sender, the agent name and request being from the content of the inline note and the sender being the user identifier.

12. The method of claim 11, wherein the API further receives information of the document or application.

13. A system comprising:
a processing system;
one or more computer readable storage media;
a communication interface;
a content creation application stored on the one or more computer readable storage media that when executed by the processing system directs the processing system to:
receive an inline note within a document, wherein the document comprises content of the inline note and other displayed content;
communicate content of the inline note and a user identifier associated with an author of the inline note to an intelligence service, wherein the content of the inline note comprises an indication of who is to receive a request and text of the request;
receive a response to the inline note from the intelligence service; and
insert the response to the inline note into the document tied to the inline note; and
a communication application stored on the one or more computer readable storage media that when executed by the processing system directs the processing system to:
receive a message from the communication interface, the message comprising a request for the response;
display the message;
receive a selection of response, the selection of response executing an interaction field for the response; and
receive a command to reply within the message, the command generating a communication to the intelligence service providing the response.

14. The system of claim 13, wherein the inline note is received within the document in response to receiving a trigger indicating content for the inline note.

* * * * *